United States Patent [19]

Mehta et al.

[11] Patent Number: 6,031,020
[45] Date of Patent: Feb. 29, 2000

[54] CANCELLATION OF MICR-READABLE DOCUMENTS BY APPLICATION OF AN INK CONTAINING MAGNETIC PARTICLES

[75] Inventors: Rajendra Mehta, Dayton; Richard Lynn Shields, Centerville; Harry Allen Seifert, Kettering, all of Ohio

[73] Assignee: The Standard Register Company, Dayton, Ohio

[21] Appl. No.: 09/140,911

[22] Filed: Aug. 27, 1998

[51] Int. Cl.⁷ .......................... C09D 11/02; C01G 49/06; C01G 49/08; C08K 3/22; C08L 33/08
[52] U.S. Cl. .......................... 523/160; 524/398; 524/431; 252/62.56; 106/31.32; 106/31.92; 428/693; 427/128
[58] Field of Search .......................... 523/160, 161; 406/31.32, 31.92; 252/62.54, 62.56; 524/431, 398, 440, 435; 427/127, 128, 131, 7; 428/464, 472, 693, 915

[56] References Cited

U.S. PATENT DOCUMENTS

| | | |
|---|---|---|
| 3,049,077 | 8/1962 | Damm, Jr. . |
| 4,026,713 | 5/1977 | Sambucetti et al. .................. 252/62.56 |
| 4,228,348 | 10/1980 | Lee . |
| 4,303,949 | 12/1981 | Peronnet ...................... 360/2 |
| 4,758,275 | 7/1988 | Yubakami et al. . |
| 4,947,321 | 8/1990 | Spence et al. ............................ 705/45 |
| 5,091,006 | 2/1992 | Sarada et al. . |
| 5,109,153 | 4/1992 | Johnsen et al. . |
| 5,128,520 | 7/1992 | Rando et al. . |
| 5,275,646 | 1/1994 | Marshall et al. . |
| 5,319,052 | 6/1994 | Prantl et al. . |
| 5,340,159 | 8/1994 | Mowry, Jr. . |
| 5,344,483 | 9/1994 | Hinton . |
| 5,597,405 | 1/1997 | Grigoryan et al. . |
| 5,639,708 | 6/1997 | Golemo et al. ........................... 503/205 |
| 5,665,429 | 9/1997 | Elwakil .................................... 427/218 |
| 5,936,008 | 8/1999 | Jones et al. .............................. 523/161 |
| 5,940,844 | 8/1999 | Cahill et al. ............................ 707/526 |

*Primary Examiner*—Vasu Jagannathan
*Assistant Examiner*—Callie Shosho
*Attorney, Agent, or Firm*—Killworth, Gottman, Hagan & Schaeff, LLP

[57] ABSTRACT

The present invention is directed to the deliberate cancellation of MICR-readable documents by applying a penetrating ink through the MICR line of the document wherein the ink contains magnetic particles which disrupt the reading of the MICR line by the MICR reader. The magnetic particles in the ink do not penetrate along with the other ink components, but remain on or near the surface of the document. These extraneous magnetic particles interfere with MICR readers by preventing accurate reading of the encoded MICR characters and cause the MICR reader to reject such a document from normal processing automatically.

16 Claims, No Drawings

CANCELLATION OF MICR-READABLE DOCUMENTS BY APPLICATION OF AN INK CONTAINING MAGNETIC PARTICLES

FIELD OF THE INVENTION

The present invention relates to MICR-readable documents, and more particularly, to the deliberate cancellation of MICR-readable documents.

BACKGROUND OF THE INVENTION

Increasingly, documents of value are created which include a printed information that can be read by a magnetic ink character recognition system (MICR). Various types of data, such as, for example, bank of issue, amount of money and account number, are commonly printed with a magnetic ink on securities, negotiable instruments, and other documents of value such that the documents can be effectively classified by using a magnetic reader. Magnetic ink character recognition involves two fundamental steps in the recognition process. First, the magnetizable ink forming a recognizable character must be magnetized to create a magnetic image of the character; and secondly, the magnetic image must be sensed or read and identified as a character in accordance with pattern recognition techniques. Focusing on the first step of the recognition process, the character field is generally divided into a plurality of discrete, vertical lines or segments, each line or segment being individually magnetized. A common magnetization technique is to apply a sinusoidally-varying magnetic field over the character, where each sinusoidal cycle is intended to magnetize one discrete segment of the character. This technique has been shown by experience to facilitate the reading and recognition of the character.

Although MICR systems allow fast and efficient automated reading of information from documents of value, one short-coming with MICR systems is that canceled, void, or used documents, which still have the magnetic ink code intact, will be read by an MICR reader without regard for their canceled or void nature and, as such, these canceled or voided documents could be mistakenly treated as documents of value. There are many instances where the importance of deliberate cancellation or voiding of these magnetically-encoded documents of value to prevent subsequent fraudulent use is readily apparent.

For example, in a printing plant where documents such as checks, money orders, vehicle titles, birth certificates, etc. are manufactured, during the set-up of a printing press, some quantity of such documents is printed which may not be perfect in all respects and is thrown out as scrap. A person with fraudulent intent can retrieve such documents and pass them off as genuine. To prevent this possibility, the printing press may be equipped with a stamping or printing device which prints the word "VOID" in a penetrating ink on all discarded samples.

In addition, in the process of developing automated forms processing equipment or recordkeeping systems, it is often necessary to conduct tests using official documents which are not issued to specific persons, etc. In these instances, it is necessary to prevent such documents from falling into the hands of persons who may use them fraudulently. Such documents are often voided by stamping by hand or machine with a penetrating ink or by hand writing with a marker pen containing such ink.

Further, at events where tickets are presented for admission, such as sporting events, concerts, etc., persons who have entered may pass their ticket stubs through a fence surrounding the site of the event to friends who may then use them to enter the event. These stubs are often stamped or marked with a typical penetrating ink at the point of entry to prevent such misuse.

A short-coming with all of the above-mentioned methods of cancellation is that the cancellation ink, even when applied over the MICR encoding, does not prevent a MICR reader from recognizing the magnetic ink underneath the cancellation ink. Therefore, a MICR reader will process the canceled or voided documents as if they were valid. Thus, these methods must rely on human intervention to discover and remove or set aside the voided or canceled documents either prior to or after MICR reading. As can be readily appreciated, such human intervention is undesirable in that the person receiving the document must not only visually recognize the ink stamp or mark, but must also be willing to take the necessary steps to prevent the fraud or misuse.

In order to circumvent the need for human intervention, methods of cancellation have been developed which prevent the MICR reader from recognizing the document as valid. For example, in commerce and industry, it is a common practice to deface valuable documents by punching holes in a pattern which spells out a word, such as "VOID" or "canceled" over the encoded magnetic ink. The MICR reader will not recognize the magnetic ink characters which are partially destroyed and will reject the document. Although effective, it is often not possible or convenient to pattern-punch documents because of the necessity of using a device which must be suited for the size of the documents and location of the MICR characters and which is inconvenient to carry from place to place.

Thus, the need remains for a convenient means of canceling magnetic ink encoded documents such that they are rejected by an MICR reader.

SUMMARY OF THE INVENTION

That need is met by the present invention. Thus, there is provided a method of voiding MICR documents by applying ink through the MICR line of the document wherein the ink contains magnetic particles which disrupt the reading of the MICR line.

In addition, there is provided a pen and stamp pad having an ink containing magnetic particles.

DETAILED DESCRIPTION OF THE INVENTION

The present invention is directed to the deliberate cancellation of MICR-readable documents by applying a penetrating ink through the MICR line of the document wherein the ink contains magnetic particles which disrupt the reading of the MICR line by the MICR reader. The magnetic particles in the ink do not penetrate along with the other ink components, but remain on or near the surface of the document. These extraneous magnetic particles interfere with MICR readers by preventing accurate reading of the encoded MICR characters and cause the MICR reader to reject such a document from normal processing automatically.

A typical ink component of the ink used in the present invention comprises a solution of a dye in an organic liquid of low viscosity (10 to 200 cps) and low volatility. Low volatility is preferred to prevent stamp pads and marker pens from drying out, and to allow the ink to remain fluid long enough to penetrate after application of the document.

In general, any organic liquid is functional if it effectively wets and penetrates the document and is an adequate solvent for the chosen dye. It is preferred, of course, that all materials should be non-toxic.

Useful organic liquid materials include the following: unsaturated fatty acids, such as oleic, linoleic, and linolenic; solvents such as glycerol, ethylene glycol, propylene carbonate, n-hexane, cyclohexane, mono and dialkyl phthalates, and high boiling petroleum distillates; drying oil such as linseed and soybean, and inert oils such as aliphatic and aromatic hydrocarbon oils; drying resins, such as alkyd and linseed oil varnishers; and heat-set and UV cure resins and oligomers, such as tripropylene glycol triacrylate, and EBECRYL 3700, available from Radcure Specialties, Inc.

It is preferred that the ink contain drying oils or resins or other reactive species which crosslink under the influence of oxygen, heat, or radiation, so that the fluid ink solidifies after penetration, thereby becoming resistant to removal by leaching with solvents and/or bleaching with oxidizing agents.

The magnetic particle component of the ink used in the present invention includes magnetic pigments, such as iron (II,III) oxide (i.e., magnetite) and black iron oxide (i.e., ferrosoferric oxide).

Based on the above, a typical ink for use in the present invention comprises from about 45% to about 55% oleic acid; from about 5% to about 10% dye, from about 15% to about 20% solvent, from about 2% to about 4% magnetic particles; and from about 18% to about 22% resin.

As used herein, the terms "ink", "penetrating ink", "penetrating ink . . . wherein the ink contains magnetic partricles" and "penetrating ink containing magnetic particles" are understood to mean any ink that contains magnetic particles in sufficient quantities to be detected by a MICR reader. It is not required for use in the present invention that the ink meet the specifications necessary to qualify as an ink capable of producing satisfactory MICR characters.

Documents of value may be conveniently voided according to the present invention by applying the penetrating ink containing magnetic particles by means of typical ink applicators, such as a pen or stamp pad. In addition, the ink may be applied by means of a printing press. Application by means of a pen or stamp pad allows convenient "on site" manual cancellation of documents of value and, as such, is particularly well-suited for use at events where tickets are presented for admission. Application by means of a printing press allows convenient "off site" or "point of origin" cancellation, and is therefore particularly well-suited for use in printing plants, etc. to dispose of scrap documents. Regardless of the means of applying the ink, the ink should be applied over at least a portion of the MICR encoded band such that the applied ink disrupts the reading of the MICR line by the MICR reader, prevents accurate reading of the encoded MICR characters, and causes the MICR reader to reject such a document from normal processing. The ink may be applied in any form which covers at least a portion of the MICR encoded band and which disrupts the reading of the MICR line by the MICR reader, and may take the form of a continuous line, dashes, words, or patterns.

What is claimed is:

1. A method of voiding MICR documents by applying an ink through the MICR line of the document wherein the ink contains magnetic particles which disrupt the reading of the MICR line.

2. A method according to claim 1 wherein the ink comprises a dye in an organic liquid of low viscosity and low volatility.

3. A method according to claim 2 wherein the organic liquid materials is selected from the group consisting of unsaturated fatty acids; solvents, drying oils; drying resins; and heat-set and UV cure resins and oligomers.

4. A method according to claim 2 wherein the unsaturated fatty acids are selected from the group consisting of oleic acid, linoleic acid, linolenic acid, and mixtures thereof.

5. A method according to claim 2 wherein the solvents are selected from the group consisting of glycerol, ethylene glycol, propylene carbonate, n-hexane, cyclohexane, mono and dialkyl phthalates, high boiling petroleum distillates, and mixtures thereof.

6. A method according to claim 2 wherein the drying oils are selected from the group consisting of linseed oil, soybean oil, and mixtures thereof.

7. A method according to claim 2 wherein the inert oils are selected from the group consisting of aliphatic hydrocarbon oil, aromatic hydrocarbon oils, and mixtures thereof.

8. A method according to claim 2 wherein the drying resins are selected from the group consisting of alkyd oil varnishers, linseed oil varnishers, and mixtures thereof.

9. A method according to claim 2 wherein the resin is tripropylene glycol triacrylate.

10. A method according to claim 1 wherein the ink comprises from about 45% to about 55% oleic acid; from about 5% to about 10% dye, from about 15% to about 20% solvent, from about 2% to about 4% magnetic particles; and from about 18% to about 22% resin.

11. A method according to claim 10 wherein the magnetic particles are iron (II,III) oxide or black iron oxide.

12. A method according to claim 1 wherein the magnetic particles are iron (II,III) oxide or black iron oxide.

13. A method according to claim 1 wherein the ink is applied as a continuous line, dashes, words, or patterns.

14. A method according to claim 1 wherein the ink is applied by means of a printing press.

15. A method according to claim 1 wherein the ink is applied by means of a pen.

16. A method according to claim 1 wherein the ink is applied by means of a stamp pad.

* * * * *